US006782456B2

(12) United States Patent
Arimilli et al.

(10) Patent No.: US 6,782,456 B2
(45) Date of Patent: *Aug. 24, 2004

(54) MICROPROCESSOR SYSTEM BUS PROTOCOL PROVIDING A FULLY PIPELINED INPUT/OUTPUT DMA WRITE MECHANISM

(75) Inventors: Ravi Kumar Arimilli, Austin, TX (US); George William Daly, Jr., Austin, TX (US); Paul K. Umbarger, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 353 days.

This patent is subject to a terminal disclaimer.

(21) Appl. No.: 09/915,432

(22) Filed: Jul. 26, 2001

(65) Prior Publication Data

US 2003/0023782 A1 Jan. 30, 2003

(51) Int. Cl.[7] .............................................. G06F 12/00
(52) U.S. Cl. ..................... 711/144; 710/22; 711/140; 711/141; 711/145
(58) Field of Search ................................ 711/144, 146, 711/140, 141, 145; 710/22

(56) References Cited

U.S. PATENT DOCUMENTS

| 5,623,628 A | * | 4/1997 | Brayton et al. | ............. 711/141 |
| 5,737,759 A | * | 4/1998 | Merchant | ..................... 711/146 |
| 6,272,603 B1 | * | 8/2001 | Arimilli et al. | ............. 711/146 |

OTHER PUBLICATIONS

IBM TDB–NN9211140, Asynchronous Pipeline for Queueing Synchronous DMA Cache, IBM Technical Bulletin, vol. 35, Issue No. 6, p. No. 140–141, Nov. 1, 1992.*

IBM TDB–NA9406241, DEMI Cache Management Policy for a Coherent DMA Cache on a Snooping Memory Bus, IBM Technical Bulletin, vol. 37, Issue No. 6A, p. No. 241–242, Jun. 1, 1994.*

* cited by examiner

Primary Examiner—Jack A. Lane
Assistant Examiner—Thang H Ho
(74) Attorney, Agent, or Firm—Casimer K. Salys; Dillon & Yudell LLP

(57) ABSTRACT

A method and data processing system that supports pipelining of Input/Output (I/O) DMA Write transactions. An I/O processor's operational protocol is provided with a pair of instructions/commands that are utilized to complete a DMA Write operation. The instructions are DMA_Write_No_Data and DMA_Write_With_Data. DMA_Write_No_Data is an address-only operation on the system bus that is utilized to acquire ownership of a cache line that is to be written. The ownership of the cache line is marked by a weak DMA state, which indicates that the cache line is being held for writing to the memory, but that the cache line cannot yet force a retry of snooped operations. When each preceding DMA Write operation has completed or each corresponding DMA_Write_No_Data operation has been placed in a DMA Exclusive state, then the weak DMA state is changed to a DMA Exclusive state, which forces a retry of snooped operations until the write transaction to memory is completed. In this way, DMA Writes that are provided sequentially may be issued in a parallel manner on the system bus and their corresponding DMA_Write_No_Data operations may be completed in any order, but cannot be made DMA Exclusive unless the above conditions are satisfied. Further, once a DMA Exclusive state is acquired, a DMA_Write_With_Data may be issued for each of the sequential DMA Write operations in the DMA Exclusive state. The DMA_Write_With_Data may then be completed out-of-order with respect to each other. However, the system processor is sent the completion messages in the sequential order of the DMA Write operations, thus adhering to the processor requirements for ordered operations while providing fully-pipelined (parallel) execution of the DMA transactions.

27 Claims, 5 Drawing Sheets

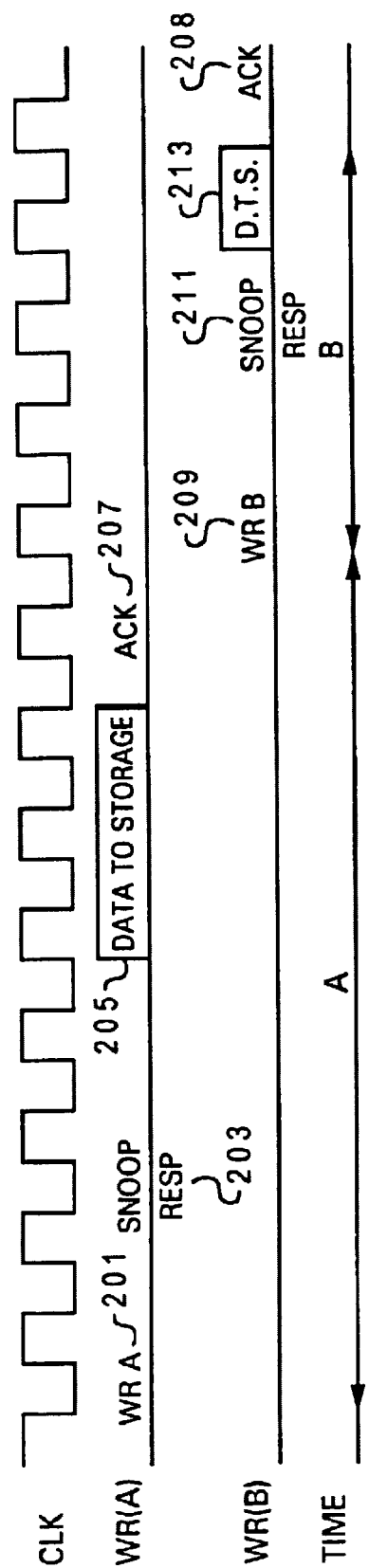
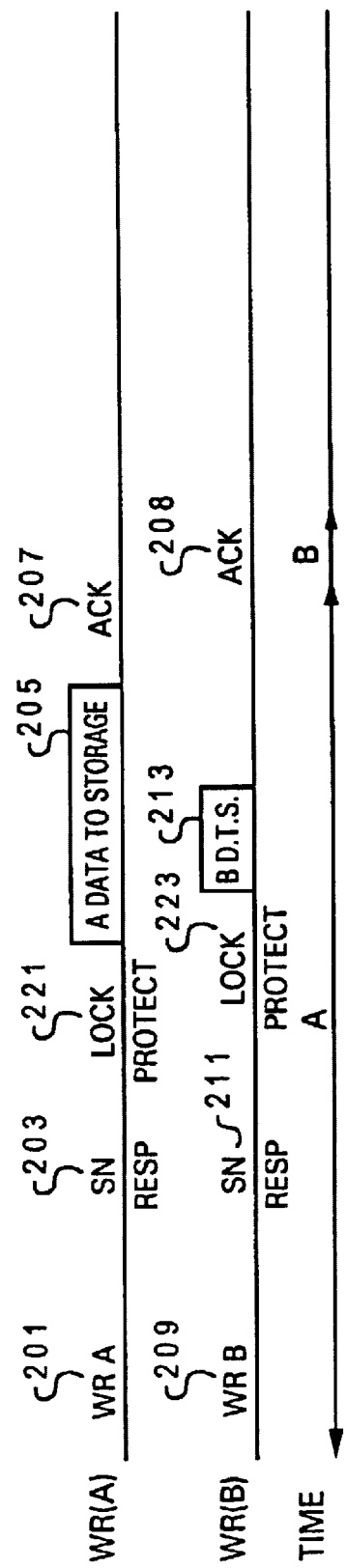
Fig. 2A (Prior Art)
Fig. 2B

MICROPROCESSOR SYSTEM BUS PROTOCOL PROVIDING A FULLY PIPELINED INPUT/OUTPUT DMA WRITE MECHANISM

RELATED APPLICATIONS

The present invention is related to the subject matter of commonly assigned U.S. patent application Ser. No. 09/915,669, entitled "DMA Exclusive Cache State Providing a Fully Pipelined Input/Output DMA Write Mechanism," filed concurrently herewith.

BACKGROUND OF THE INVENTION

1. Technical Field

The present invention relates generally to data processing systems and in particular to input/output (I/O) mechanisms of a data processing system. Still more particularly, the present invention relates to a method and system for providing fully pipelined I/O Direct Memory Access (DMA) write operations.

2. Description of the Related Art

A standard data processing system comprises one or more central processing units (CPU), one or more levels of caches, one or more memory, and input/output (I/O) mechanisms all interconnected via an interconnect. Traditionally, the interconnects utilized consisted primarily of a system bus and an I/O bus. In newer processing systems, however, particularly those with large numbers of CPUs and distributed memory, a switch is often utilized as the interconnecting mechanism.

In addition to the major components, data processing systems today are often equipped with an I/O controller, which controls I/O operations for the various I/O devices. More than one I/O controller may be utilized, each supporting particular I/O devices via an I/O channel, and the I/O controllers may be coupled to the interconnect via an I/O bus. Further, new processing systems typically comprise a plurality of paths (buses) for routing transactions between the I/O controller and the memory or distributed memory. Each path includes a series of latches, etc., and may each have different transmit times/latency based on the distance to/from the memory and number of latches, etc. Data is transmitted along these paths in a packet-like manner and each data packet may have different access latencies. Thus, in operation, data A written to a first memory or memory location may have a different access latency than data B written to a second memory or memory location if data A travels on a different path than data B.

Computer systems typically provide at least one system bus and a system memory area that is predominantly used by one or more processors for computation and data manipulation. I/O is sometimes performed by the processor. However, utilization of the CPU to perform input/output (I/O) transfers for these peripheral devices and subsystems places a burden on the CPU and negatively affects the CPU's efficiency. Thus, Direct Memory Access (DMA) controllers have been provided in computer systems for offloading transaction work from the CPU to a dedicated controller, in order to increase the availability of the CPU to perform computational and other tasks.

Each DMA operation is a specialized processor operation that transfers data between memory and I/O devices. The DMA transaction operates as a master on the I/O bus and is frequently a part of the I/O controller. When, the I/O controller completes the DMA task, the I/O controller signals (i.e., sends an interrupt to) the processor that the task specified is complete.

The DMA controllers free the processor from I/O tasks and usually perform transfers more efficiently. DMA I/O transfers can also be performed by the devices themselves. This type of device is referred to as a "bus master" because it is capable of acquiring a bus and transferring data directly to and from memory or devices located on the bus.

The application software or device driver performs data communication with the device by writing or reading the data to or from memory and signaling the device or DMA controller to perform the transfer. A DMA transfer can also be performed from one device to another device using two discrete DMA transfers, one writing to memory, i.e., a DMA Write and the second reading from memory, i.e., a DMA read. With a DMA Write, the input device data is transferred to system memory from the input device by a DMA controller or by the input device if it is a bus master and the data is written to system memory.

The I/O channels provide input and output commands to and from peripheral components, respectively. Standard, logical operation of current processing systems requires that operations to memory be completed in the order in which they are received (i.e., sequential program order). Thus, the I/O channels operate as a First In First Out (FIFO) devices because the I/O writes to system memory from a device must be "ordered" to the system memory. That is, for example, an I/O DMA Write command of a 128 Byte cache line A that is sequentially followed by an I/O DMA Write command of a 4 Byte cache line B has to be completed (i.e., data written) before the write of cache line B can begin execution. The write data B request is placed in the FIFO queue at the I/O controller and waits on the receipt of a completion signal from the write data A operation. The processor begins execution of write data B command only after receipt of a completion signal.

FIG. 2A illustrates a sample timing diagram by which the writes of data A and data B are completed according to the prior art. As shown, DMA Write A 201 is issued at time 0 (measured in clock cycles) and a corresponding snoop response 203 is generated and received several cycles later. When the clean snoop response 203 is received, often after several retries of DMA Write A 201, the acquisition and transmission of data A to the memory block is undertaken over the next few cycles. Then, the actual writing (storage) of data A 205 is completed over several cycles. Following the completion of the write data A 205, an acknowledgment 207 is sent to the processor to indicate the completion of the write data A operation. Once the acknowledgment 207 is received, the DMA Write B data 209 commences and takes several cycles to complete (see snoop response 211 and B data to storage 213). Data B is then stored in memory. Since no operation is issued to the I/O bus while the DMA Write data A operation is completing, the bus remains idle for several cycles and write data B 209 is held in the FIFO queue.

Once the write A command is issued, the processor waits for the return of a tag or interrupt generated by the successful completion of the previous write data A operation. When the tag or interrupt returns, this indicates that data A storage to memory is completed, and the CPU can then issue the read data B command.

The logical structure of processing systems requires that I/O operations be ordered in the I/O channel. Thus, the I/O channel must write the data to memory "in-order" and also must wait until the successful completion of the previous operation before issuing the next operation. This waiting/ polling is required because, as in the above example, if write B is issued prior to the completion of write A in current systems, write B would be completed before write A because of the smaller size of data B. This would then cause corruption of data and the corrupted data would propagate throughout the execution of the application resulting in incorrect results being generated and/or possibly a stall in the processor's execution.

The long latency in completing some write operations, particularly those for large data such as data A, coupled with the requirement that the next operation cannot begin until after the completion of the previous write operation significantly reduces overall processor efficiency. The present architectural and operation guidelines for processing systems that require the maintenance of the order when completing operations is proving to be a significant hurdle in development of more efficient I/O mechanisms. Currently, system developers are looking for ways to streamline the write process for I/O operations. Pipelining, for example, one of the key implementation techniques utilized to make CPUs faster, has not been successfully extended to I/O transactions because of the requirement that the previous data operation be completed prior to the next operation beginning. Current DMA transactions operate as single threaded transactions (or in a serialized manner), and there is currently no known way to extend the benefits of pipelining to DMA operations. One method suggested to reduce the latency is to move the I/O controllers closer to the I/O device thereby reducing the transmission time for acquisition of the data on the bus. However, because most of the latency in I/O transactions is tied to the wait for completion requirement and not the actual transmission of the data, these methods do not solve the problem of long latencies for I/O DMA operations.

The present invention recognizes that it would be desirable to provide a method, system and I/O processor operational logic that enables pipelining of I/O DMA Write operations. A method, system, and processor logic that enables reduction in latency in the completion of a stream of I/O DMA Write transactions would be a welcomed improvement. These and other benefits are provided by the invention described herein.

SUMMARY OF THE INVENTION

Disclosed is a method and data processing system that provides pipelining of Input/Output (I/0) DMA Write transactions. An I/O processor's operational protocol is provided with a pair of instructions/commands that are utilized to complete a DMA Write operation. The instructions are DMA_Write_No_Data and DMA_Write_With_Data. DMA_Write_No_Data is an address-only operation on the system bus that is utilized to acquire ownership of a cache line that is to be written. The ownership of the cache line is marked by a weak DMA ownership state, which indicates that the cache line is being held for writing to the memory, but that the cache line cannot force a retry of snooped operations. When all preceding DMA Write operations complete or each corresponding DMA_Write_No_Data operation has acquired the cache line exclusively for the DMA operation, then the weak DMA ownership state is changed to a DMA Exclusive state. The DMA Exclusive state causes a retry of snooped operations until the write transaction to memory is completed. In this way, DMA Writes that are provided sequentially may be issued so that their respective operations occur in a parallel manner on the system bus and their corresponding DMA_Write_No_Data operations may be completed in any order, but cannot be made DMA Exclusive unless the above conditions are satisfied.

Further, once a DMA Exclusive state is acquired, a DMA_Write_With_Data may be issued for each of the sequential DMA Write operations in the DMA Exclusive state. The DMA_Write_With_Data may then be completed out-of-order with respect to each other. However, the system processor is sent the completion messages of each DMA_Write_With_Data operation in the sequential order in which the DMA Write operations were received, thus adhering to the I/O processor's requirements for ordered operations, while providing fully-pipelined (parallel) execution of the DMA transactions.

According to a preferred embodiment, weak DMA ownership is indicated by an affiliated cache state (D1). Likewise, DMA Exclusive is also indicated by an affiliate cache state (D2). A cache line transitions from D1 to D2 once DMA Exclusive ownership is acquired by the requesting process. After the cache line is written to memory, the D2 state transitions to either MESI Invalid or Exclusive states dependent on the system's operational requirements.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like numbers correspond to like elements and further:

FIG. 2A is a timing diagram of a sample DMA Write transaction according to the prior art;

FIG. 2B is a timing diagram of multiple "pipelined" DMA transactions according to a preferred embodiment of the invention;

DESCRIPTION OF THE ILLUSTRATIVE EMBODIMENTS

Figure 1:
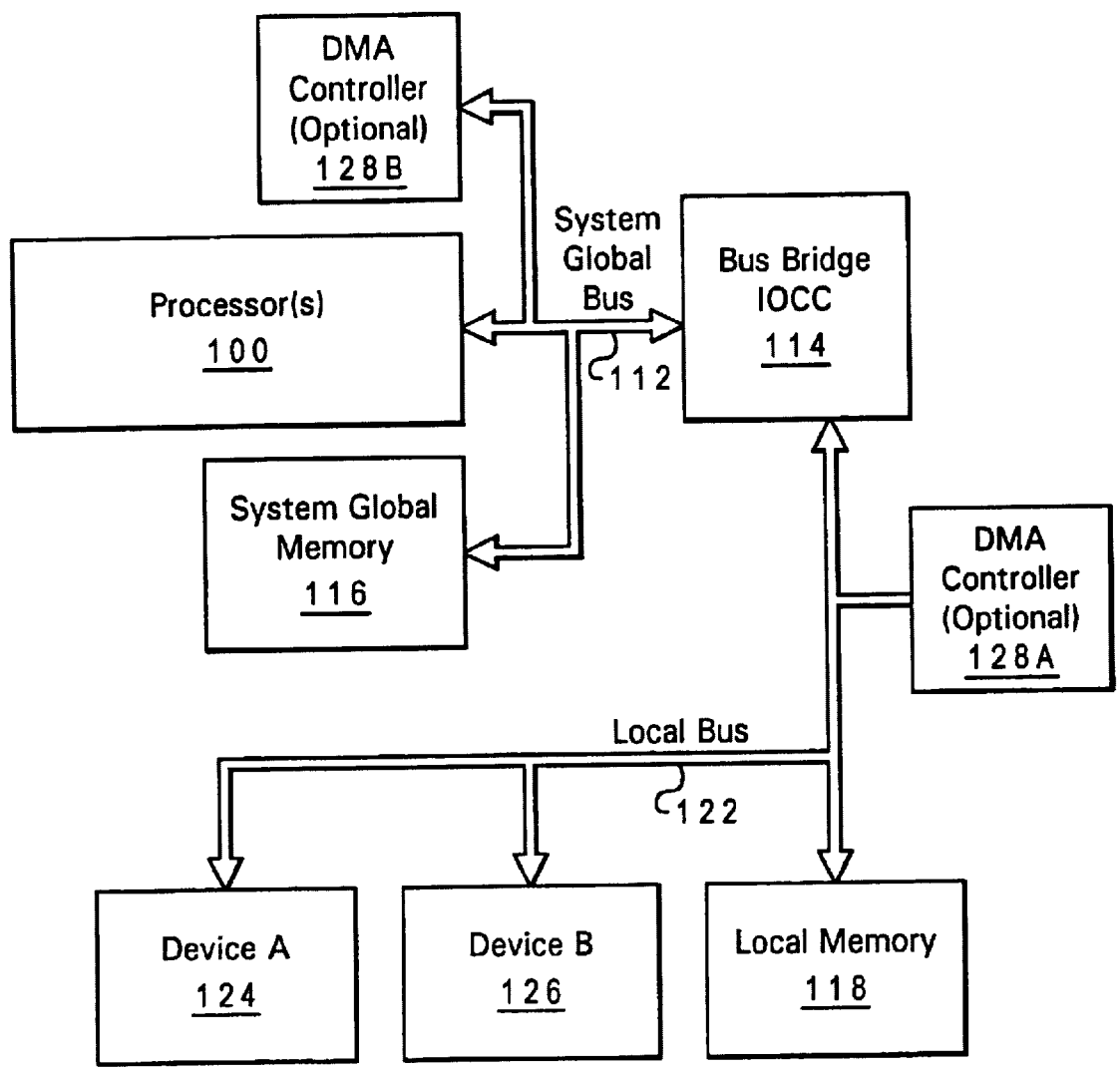
FIG. 1 is a block diagram illustrating the core components and peripheral devices of a data processing system in which the preferred embodiment of the invention may be implemented.

With reference now to the figures, and in particular with reference to FIG. 1, the core components of a computer system in which the present invention may be practiced are depicted in block diagram form. Processor 100 is coupled to system global memory 116, (which may include cache memories as well as planar memory arrays), by system global bus 112. Optional DMA controller 128B is coupled to system global bus 112, and optional DMA Controller 128A is coupled to local bus 122. Bus bridge 114 couples local bus 122 to system global bus 112, using bus bridge or Input/Output Channel Controller (IOCC) 114 local bus 122 may be a local Peripheral Component Interconnect (PCI) or Personal Computer Memory Card International Association (PCMCIA) bus that connects peripheral device A 124, device B 126, and local memory 118.

The hardware architecture supports direct DMA transfers from device to device and device to local memory 118 transfers. In addition, a peripheral connected to local bus 122 is able to transfer data via direct memory access (DMA) to system global memory 116 through IOCC 114, which is designed to translate transactions on local bus 122 to transactions on system global bus 112.

The devices 124, 126 are preferably bus masters, i.e., they generate the transactions locally. Otherwise, IOCC 114 is provided with a DMA controller capability. In one embodiment, a DMA Controller 128A is coupled to local bus 122, and a DMA transaction can be made between non-bus master devices 124, 126 and local memory 118 without causing transactions to occur on system global bus 112. DMA controllers 128 are preferably utilized for embodiments wherein the devices exchanging data with memory are not bus masters and therefore need an external controller to perform DMA transfers.

According to the preferred embodiment of the invention, computer system of FIG. 1 provides multiple different address and communication paths between IOCC 114, DMA Controller 128A, DMA Controller 128B and system global memory 116. System global memory 116 may be a distributed memory or single memory supporting multiple transfer paths to and from IOCC 114. Each path comprises latches and staging components, and each path may exhibit different access/transmission latencies.

The present invention provides a method and system of I/O operation by which DMA Writes are executed in a fully pipelined manner thereby decreasing latency between individual write operations. DMA Writes that are received in a serial order are executed parallel to each other (i.e., their respective operations may be issued sequentially in a pipe lined manner but execute on the system at the same time), and the actual writes to memory may be completed out of order without disturbing the logic sequence of the processor. The preferred embodiment of the invention comprises introduction of two new executable instructions (or commands) and modifications to the processor/cache logic (or IOCC) to support the two new instructions. Additionally, the invention introduces a "DMA Exclusive" (D) state for a DMA request of a cache line that is given weak ownership of the cache line. As utilized herein, the term "exclusive" means that the DClaim operation owns the line and can prevent others from accessing it. It is not synonymous with the exclusive (E) state of a cache line as provided by the MESI protocol. The E state of the MESI protocol contains valid memory data, while the DMA Exclusive state does not contain memory data and just provides (or indicates) cache line "ownership."

Two new coupled instruction executables (commands) are provided: (1) "DMA_Write_No_Data" and (2) "DMA_Write_With_Data." The two operate as a pair of instructions that perform the operation of a single DMA Write request that is executed. DMA_Write_No_Data is an address only transaction for I/O (i.e., no data is transmitted). DMA_Write_No_Data is similar to a DClaim operation, which is utilized to gain ownership of the cache line to be written later. When a DMA_Write_No_Data is issued, the cache responds by forcing a retry or providing the DMA Write request with weak exclusive ownership of the cache line. For illustrative purposes, the invention is described with reference to DClaim operations, although any operation that provides the functional features of a DMA_Write_No_Data is applicable.

When the DMA_Write_No_Data is issued, the cache's snooper treats it like a DMA Write and responds accordingly, except that no data is provided even if the data is present in the cache and is clean. Thus, the DMA_Write_No_Data is issued, and when a snoop response indicates that the cache line is clean, i.e., it is in a valid state or there is no other processor arbitrating for the cache line, the DMA_Write_No_Data is provided weak ownership of the cache line. (The I/O DMA Controller is messaged that the cache line is available for a write operation). If the snoop response does not indicate a clean state for the cache line, the DMA Write_No_Data (or DClaim) may be reissued.

DMA_Write_With_Data is an actual write command that writes (stores) the data acquired from the cache line to memory. Unlike the DMA_Write_No_Data, which is issued as soon as a DMA Write request is received, the corresponding DMA_Write_With_Data is not completed until the DMA Write request gains protection (i.e., full/exclusive ownership) of the cache line, and the completion of the DMA_Writes_With_Data operation is not messaged to the IOCC until all preceding sequentially-ordered DMA_Writes_With_Data instructions are completed and in the idle state.

Utilizing the above DMA commands and the operational logic associated with each command, the DMA Write request transitions in a state-machine fashion from weak ownership of the cache line, to exclusive ownership, to a released state. Progression between states is controlled by the IOCC, which monitors the operations within its multiple state machines.

Figure 3:
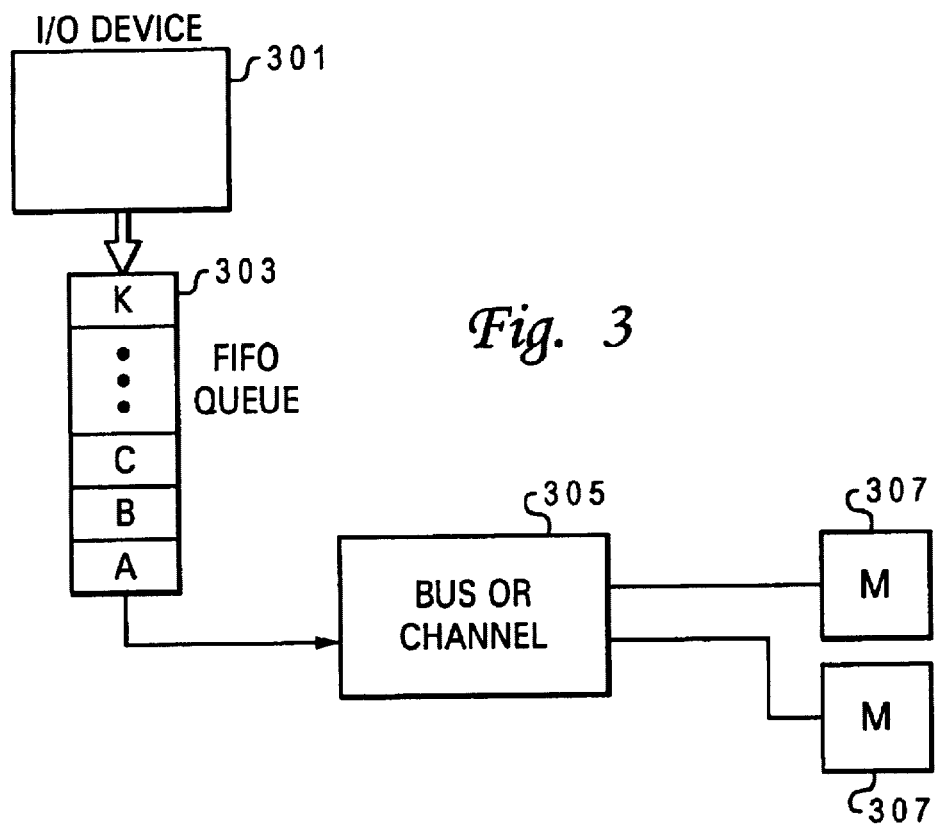
FIG. 3 illustrates a FIFO queue of several DMA Writes according to one implementation of the current invention.

FIG. 3 illustrates a FIFO queue 303 of a DMA controllable I/O device 301 connected to several memory devices 307 via an I/O channel 305. Within FIFO queue 303 are several write commands, labeled alphabetically from A through K, which may each be completed on different memory blocks. According to the present invention, the write transactions are serially received within the FIFO queue but may be completed in a parallel fashion, wherein later writes to memory may be completed before earlier writes to memory (i.e., out-of-order write transactions).

Figure 4:
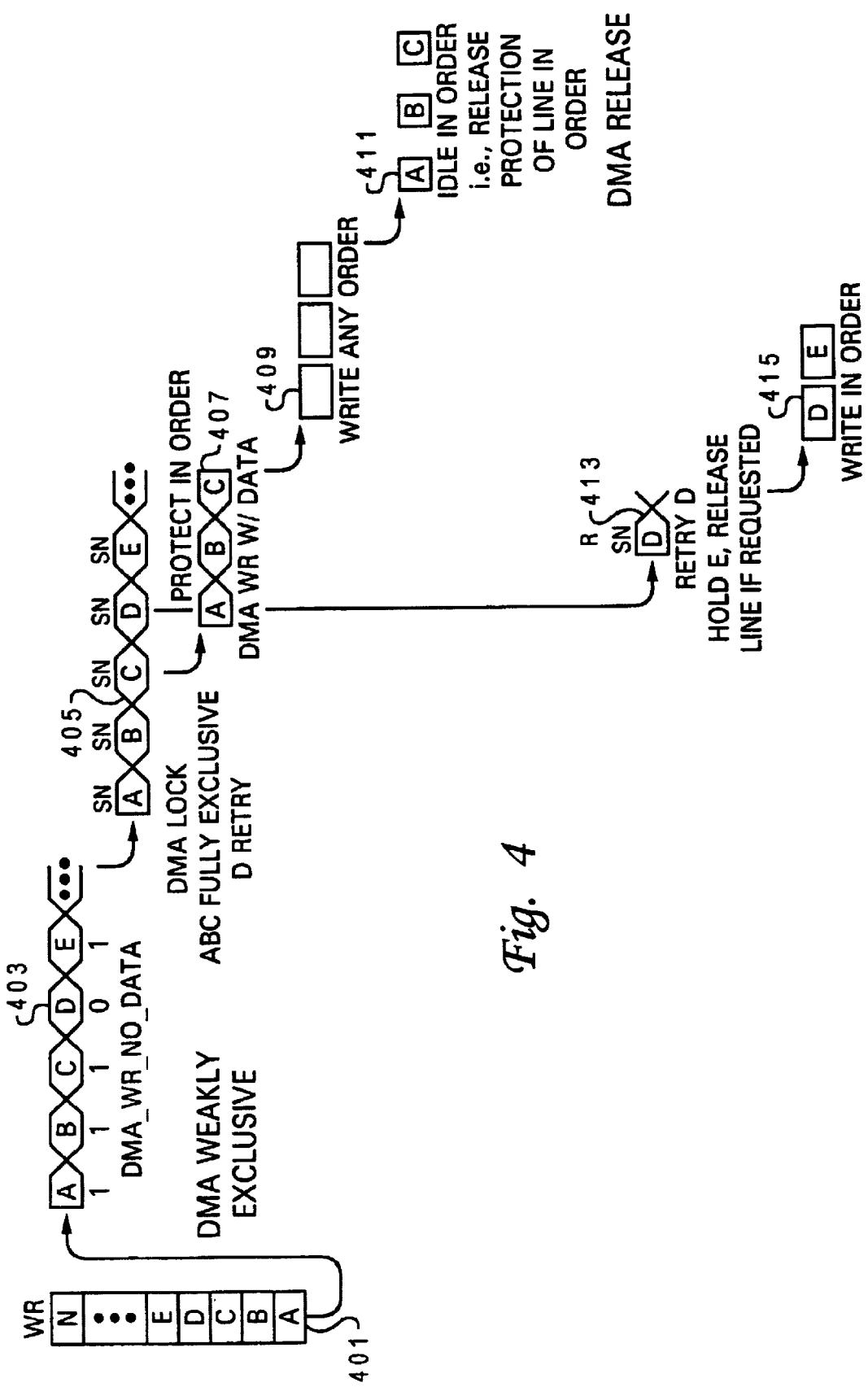
FIG. 4 illustrates the operation of the invention with multiple DMA Write transactions pipelined in accordance with a preferred embodiment of the invention.

FIG. 4 illustrates an example process by which the write transactions in the FIFO queue of FIG. 3 are handled according to the features provided by the invention. Serialized DMA Write requests are sent to FIFO 401 by processor or other components that generate the DMA Write requests. Placement of the DMA Write requests in FIFO 401 triggers the issuing of a DMA Exclusive claim (DClaim) operation, i.e., a DMA_Write_No_Data is issued on the bus. FIG. 4 illustrates the DMA_Write_No_Data 403 within latches. Thus, the DMA_Write_No_Data 403 are issued on the bus in parallel manner, and all propagate on the bus to snoop their respective cache lines.

A snoop response 405 is generated for each issued DMA_Write_No_Data 403. According to the illustrated embodiment, each issued DMA_Write_No_Data operation is assigned a single bit value indicating the snoop response received for the particular operation. As utilized herein, a bit value of 1 indicates a clean response, i.e., the DMA_Write_No_Data operation is provided with weak ownership of the requested cache line, and a bit value of 0 indicates a dirty response, i.e., no ownership of the cache line provided. According to the values indicated in FIG. 4, no ownership was provided to DMA_Write_No_Data for cache line D.

The invention thus involves the introduction of two bus transactions to complete each DMA Write, the first, "DMA_Write_No_Data", and the second "DMA_Write_With_Data." DMA controller logic generates the two DMA Write commands and controls the checking and monitoring of previous DMA operations. The instruction set and bus protocols are modified to support these two commands.

Returning now to FIG. 4, in one embodiment, the 1 value may indicate that the write transactions are fully DMA Exclusive while the 0 value indicates that a cache line is retried. Following the return of the snoop response, the DMA Write requests that received the clean responses are later protected, i.e., provided full DMA Exclusive ownership of the cache lines, and the actual write commands are issued as DMA_Write_With_Data 407 that may be completed in any order. According to the invention, DMA Exclusive ownership of the cache line simply provides the go ahead for the DMA_Write_With_Data operation even when intervening actions occur, for example, another processor seeking to modify the cache line. Thus, the cache line corresponding to DClaim (D) of FIG. 3 is not DMA Exclusive.

Ideally, all cache lines are DMA Exclusive, as this allows for pipelining of all the DMA Writes (i.e., the DMA_Write_With_Data). With a DMA Exclusive, the IOCC ignores other requests to provide ownership of the cache line other than to the DClaim, and each cache line stands on its own. Operations having DMA Exclusive state are coupled together and will each force a retry of any snoops against their protected cache line. The coupling effects of multiple DMA Exclusive states is thus provided, thus allowing writes to be completed to memory out-of-order.

In order to implement the DMA Exclusive state, rules are coded within the IOCC about how and when to give up these exclusive lines. According to the above example, assuming a clean response is referenced by a 1 and a retry is referenced by a 0, the illustrated stack of DMA_Write_No_Data operations indicate a 11101 snoop response. If a processor desires to access the cache line, which is weakly owned by the DClaim of DMA Write C, DMA Write C is forced to give up the line unless C has acquired a protection of the line, and DClaim (C) may have to be retried to get the cache line or DMA Write C may simply issue as a normal DMA Write. When the cache line is in the protected state, however, i.e., exclusive ownership of the cache line is acquired, a processor request for the data within the cache line that is propagated on the bus has to wait until the data is stored to memory.

The actual DMA Write process 409 is completed in any order. Thus write A, B, and C operations may be completed in parallel and/or almost simultaneously. The completion acknowledgments 411 of the write operations are, however, messaged back to the IOCC in order. As indicated, once A, B, and C become fully exclusive (protected), the data is written to system memory in "any" order, thus allowing fully pipeline transactions within the I/O channel. Completion in any order is allowed because each write may be issued to its respective memory block via a different path to memory.

Each write transaction is released (i.e., completion messaged to the IOCC) in order to ensure that the IOCC requirements for in-order completion of DMA Writes is complied with. Further, any attempt to read the memory block of a DMA_Write_With_Data prior to a completion of all other DMA_Write_With_Data sequentially ahead will be retried until the completion signal is messaged to the IOCC. A retry of DClaim (D) 413 is sent to the cache and when D finally receives ownership of the cache line, DMA_Write_With_Data for D is completed. However, no DMA_Write_With_Data operation for E is allowed until the operation for D is completed and there is no pipelining effect due to the un-surety of gaining ownership of the cache line requested by DClaim(D).

DMA_Write_Without_Data operations may be issued sequentially, i.e., the addresses are sent out on the bus and completed in parallel. The DMA operations want all cache lines to be DMA Exclusive, i.e., the DMA operations are each arbitrating for DMA Exclusive command/ownership of a particular cache line. When the DMA operation acquires the cache line in a fully DMA Exclusive state, then a write with data is issued. Otherwise, all processing of later write operations are placed on hold. The DMA_Write_With_Data commands are grouped and issued to the memory simultaneously or in a parallel fashion. Thus according to the example, A, B, and C are DMA Exclusive so they can be grouped and written to system memory in any order, allowing the I/O channel to fully pipeline the transactions.

With reference again to FIG. 4, DMA Write A, B, and C are in a strongly ordered mode and can be grouped for completion of the write operations. This is because all the snoop responses are clean and thus each write has ownership (albeit weak) of its cache line and may write the cache line once it gains protection for the cache line. The order of writing the cache line is not dependent on where the DMA Write request falls in the sequential order received from the IOCC. Thus A, B, and C form a strongly enforced grouping, while D and consecutive write commands form a weakly enforced grouping.

DMA Write D cannot be completed until DMA Write A, B, and C are completed. Thus, according to the invention the DClaims are immediately issued and parallely executed, but the actual writes are only issued when the DMA Write acquires exclusive ownership of the cache line and knows, based on the established rules, that it can write the data (although a DMA Write at the head of the DMA stack may proceed to write data without issuing a DMA_Write_No_Data as explained above). Once DMA Exclusive ownership of the cache line is acquired however, the data can be written in any order. According to the preferred embodiment, only the addresses of the cache lines are transmitted in the DClaim transaction and the data itself is only transferred during the actual DMA_Write_With_Data operation.

If another processor attempts to get ownership of data block E, then the processor is able to do so because the issuing IOCC cannot protect the data cache line since the previous DMA Exclusive request (on D) has to be retried on D. Therefore, the write request for E 415 has to be polled until a DMA Exclusive is received.

Thus, each of the issued operation has a response, which is monitored by the DMA controller logic to determine what actions to take with respect to the DMA operation or IOCC interaction. If a clean response is not received or if no response is received by a time-out period, a snoop is retried until an appropriate response is received. In one embodiment, if the DClaim is lost or the snoop returns with a dirty response, then the DMA Write is issued as a normal/regular DMA Write and no retry of the DClaim occurs.

DMA controller logic contains specific rules for the correct implementation of the DMA Write transactions and functionality. According to the preferred embodiment, whenever DMA Writes are encountered, DClaims are immediately issued and commence a state machine operation. When a clean response is received, the DClaim is given weak ownership of the cache line. Whenever a previous DMA_Write_No_Data has not gotten a clean snoop response, the corresponding DMA_Write_With_Data is not launched until all previous DMA Writes ahead of it have launched. However, for the first DClaim operation in a series of DClaim operations (e.g., DClaim of A), the DClaim write may be immediately launched. Also, while in a weakly own state, if another request is received for the cache line, for example, a read-with-intent-to-modify, then the DClaim is forced to give up the cache line.

Notably, in the preferred embodiment, no limitations exist on the DMA Write that is at the head of the sequential stack of DMA Write requests. Thus, DMA Write A does not have to issue a DMA_Write_No_Data because it is the first DMA Write in the stack. IOCC logic checks for previous DMA Writes in the instruction sequence and, when there is no preceding DMA Write (i.e., the current DMA Write operation is the head of the stack), that DMA Write is "exempted" from having to first issue a DMA_Write_No_Data and wait for a DMA Exclusive. Rather the DMA Write operation is sent directly to memory and the cache line is written to memory. Accordingly, at worst case, if each previous DMA Write completes before a subsequent DMA Write is placed in the FIFO, no performance degradation is seen from current systems, but substantial performance benefit is possible whenever multiple DMA Writes are sequentially issued/placed within the FIFO and pipelined.

Figure 5:
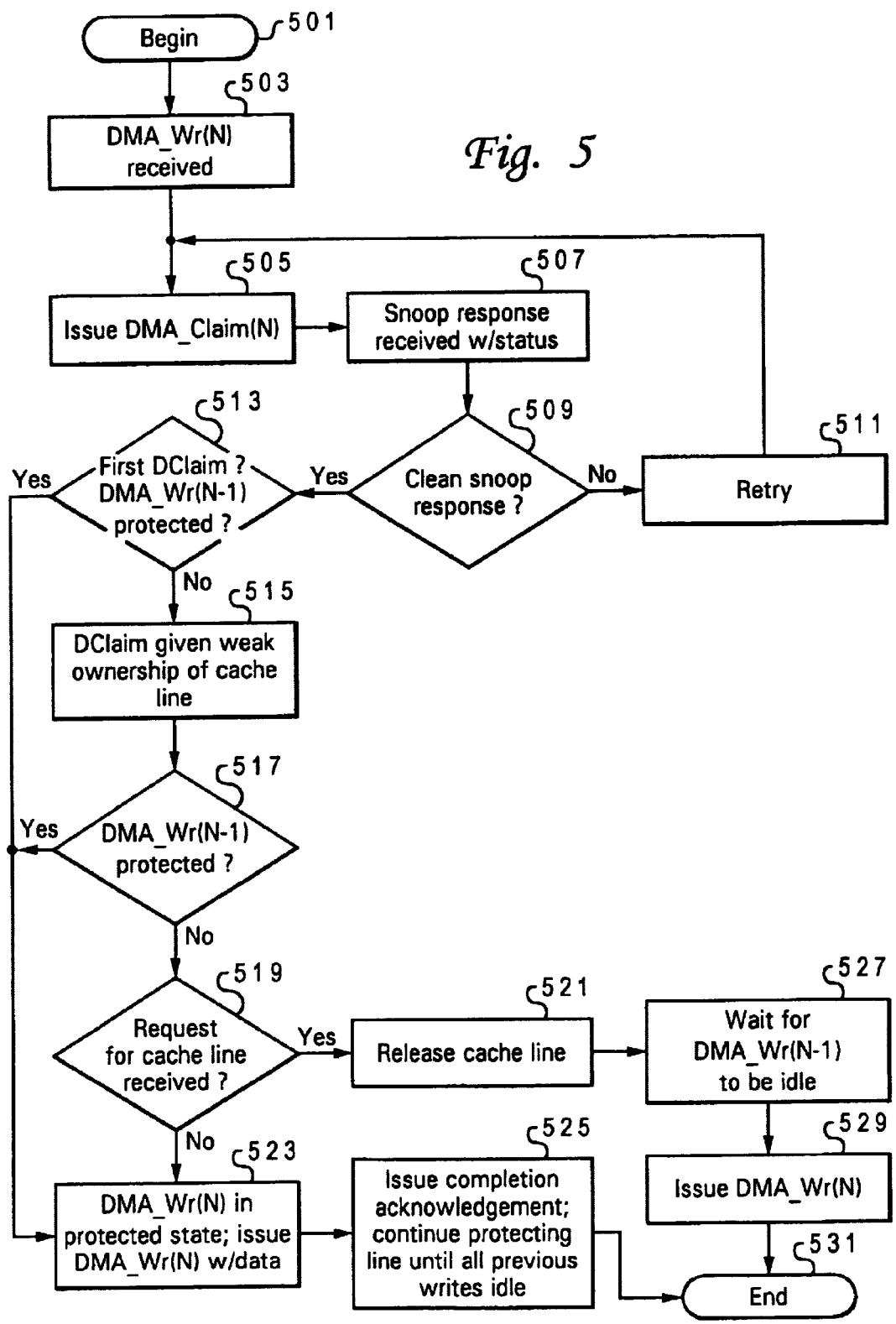
FIG. 5 is a flow chart of the process of pipelining DMA Write transactions according to a preferred embodiment of the present invention.

Turning now to FIG. 5, there is illustrated the process of pipelining DMA Write transactions according to one implementation of the invention. The process begins at block 501 and thereafter proceeds to block 503 where a DMA_Write (N) is received. The process simplifies an operation in which several DMA Writes (e.g., DMA_Write (N−2), DMA_Write (N−1), DMA_Write(N), DMA_Write (N+1)) are provided in a pipelined fashion. DClaims are issued for each DMA transactions to secure ownership of the cache line that holds the data. DClaim (N−1) is sent independent of the state of DClaim (N−2) or DClaim (N), etc. If a clean response is received for a DClaim, then the corresponding DMA Write is provided exclusive ownership of the cache line. If a clean response is not received, the DMA Write retries its DClaim operation.

Returning now to FIG. 5, following the receipt of DMA Write(N), a DClaim (N) is issued for the cache line associated with DMA Write(N) as shown at block 505. DClaim (N) is issued immediately after the DMA Write(N) is received from the IOCC. In response to the issuing of the DClaim (N), a snoop response is received with status information as shown at block 507. A determination is made at block 509 whether the snoop response indicates a clean cache line. If the snoop response does not indicate a clean cache line, the DClaim (N) is retried as indicated at block 511. If a clean response is received, however, a next determination is made whether the DMA Write(N) is the first DMA Write of the application/program or whether the DMA Write(N−1) has received exclusive ownership of its cache line as shown at block 513. If neither conditions are true, the DClaim (N) is given weak ownership of the cache line as indicated at block 515. DClaim (N) weakly owns the line if it gets a clean response but DMA Write(N−1) not yet reaches protection point and must release ownership of the line if another request for that line is received.

Following, a determination is made at block 517, whether the DMA Write (N−1) has acquired exclusive ownership of its cache line, i.e., if the cache line is protected. If the cache line is not protected a next determination (or a monitoring function) is completed as shown at block 519, whether a request for the weakly owned cache line has been received. If no request has been received for the cache line or if DMA_Write(N−1) has received protection or if the DMA Write (N) was the first write of the application, then DMA Write(N) is placed in the protected state and the DMA_Write(N)_With_Data is issued to commence writing the data to memory as illustrated at block 523. DMA Write (N)_With_Data is executed because it is in the protected state (i.e., exclusive ownership of the cache line has been acquired). The protection of DMA Write must be released in the order in which the DMA Writes were received from the IOCC and a completion acknowledgment is issued once the previous writes have been completed as shown at block 525. Then, the process ends as illustrated at block 531.

Returning now to block 519, if a request for the cache line is received while the DClaim has weak ownership, the cache line is released to the requesting process as shown at block 521. Then the DMA Write(N) is forced to wait until DMA Write(N−1) is idle as depicted at block 527. Once DMA Write (N−1) (that is all previous write operations) is idle, then DMA Write (N) is issued as shown at block 529. Then the process ends as shown at block 531.

According to one embodiment, no change to the coherency protocol is required because the new DMA Exclusive (D2) state applies solely to DClaim operations and communication between the DMA and the processor holding the cache line. The D state is held by the IOCC and the IOCC will not give up the data to another snooper if the data is being held in that state.

Figure 6:
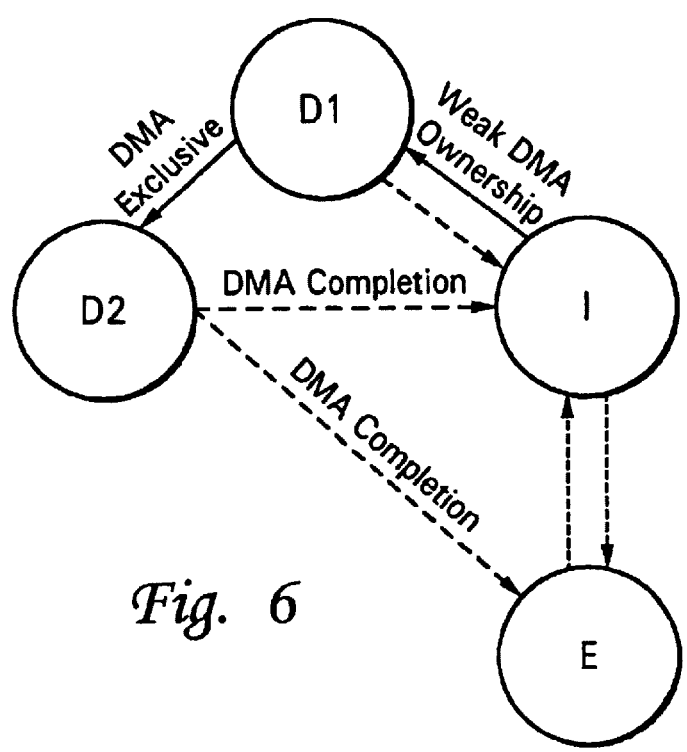
FIG. 6 is a diagram of the coherency state transitions with a DMA Exclusive state according to a preferred embodiment of the invention.

In another embodiment, however, the invention introduces two new I/O coherency states to supplement the coherency protocol being utilized for I/O transactions. FIG. 6 illustrates the coherency states and their transitioning characteristics. Notably, the Invalid (I) and Exclusive (E) states of the MESI protocol provide the initial and final states of the transition. The D1 state indicates weak DMA ownership of a cache line and the D2 state indicates DMA Exclusive ownership of the cache line. As illustrated, a cache line's coherency state transitions from I to D1 when a DMA_Write_No_Data is snooped that acquires ownership of the cache line. The coherency state transitions from D1 to D2 when the conditions described herein for DMA Exclusive ownership occur. From D2, the coherency state transitions either to E or to the I state depending on the operating characteristics of the data processing system. In the preferred embodiment, the D2 transitions to I once the cache line is written to memory. In an alternate embodiment, D2 transitions to E to allow other processor operations that wish to gain access to the line to do so. Transition from D1 to I is also possible and occurs whenever an operation is snooped for the cache line while the cache line is in the DMA weak ownership state.

The state transitions are provided within the I/O directory associated with the I/O cache according to the system configuration and operational protocols. The invention further contemplates the extension of the utilization of the D1 and D2 states to a processor cache and cache directory for other operations that may require temporary holding states.

Each DMA Write process represents a state machine that cycles from beginning, when the DMA Write first issues, to end, when the IOCC is messaged with the completion of the writing/storage of the data. The state machine is set to idle once it completes the storage of the data if special conditions are met. According to the invention, the logic forces the state machine to stay active (i.e., not go idle) if there are any state machines associated with previously issued DMA Writes that have not yet gone idle. Once the state machine goes idle, the IOCC is signaled that the corresponding DMA Write operation is completed. The commands may be executed in parallel, but must be seen as completed in order by the IOCC. Thus, a background kill operation on a previous write command has to be completed before the state machine goes to an idle state.

FIG. 2B illustrates the performance benefits of the present invention over the presently available methods. Similar operations are tracked as those provided in FIG. 2A and numbered alike. Unlike FIG. 2A, however, DMA Write B (i.e., DClaim and DMA_Write_With_Data) is issued in parallel to corresponding operations of DMA Write A. Ownership of the associated cache line is acquired while the DMA Write A operations are proceeding. After DMA Write A acquires full ownership of its cache line 221, DMA Write B also acquires full ownership 223 and issues DMA_Write (B)_With_Data 213 whereby data B is written to memory prior to the completion of storage of data A to memory. When data A has completed being stored, an acknowledgment 207 is sent to the IOCC indicating completion of the DMA Write A transaction, and immediately following, an acknowledgment 208 is sent to the IOCC indicating completion of DMA Write B transaction. Thus the order of completion is preserved from the viewpoint of the IOCC and substantial time savings is recognized.

Another related embodiment extends the features of the invention to bus transactions with special architectural mechanism. For example, when applied to pre-fetching operations, the features of the invention allows looking ahead or speculating with I/O and looking ahead to writes in parallel. Thus, an assumption that the DMA Writes occurs sequentially in the instruction stream is made and a DClaim for a next cache line is issued in parallel to the previous DClaim before the address is actually received. In another embodiment, the features of the invention may be further utilized to determine what processes may be needed at a future time and keeping the processes in a separate directory or history of each set of transactions. This further allows extending the features of the invention to completion of write without data by priming the IOCC even before requesting information or data.

Although the invention has been described with reference to specific embodiments, this description should not be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method for pipelining DMA Write operations in a data processing system having a memory and an Input/Output (I/O) processor, said method comprising:

performing a first operation to place a cache line being requested by a DMA write instruction in a weak ownership state;

delaying issuing of a second operation that writes said cache line to said memory until all other cache lines requested by previously issued first operations are also in said weak ownership state; and forwarding said cache line along with said other cache lines to said memory in any order, responsive to said cache line and said other cache lines all being in said weak ownership state.

2. The method of claim 1, wherein said performing step is completed responsive to a receipt by said I/O processor of a DMA Write request among a plurality of sequentially ordered DMA Write requests, and further comprising generating said first operation for acquiring ownership of said requested cache line and said second operation for writing said requested cache line to memory.

3. The method of claim 2, further comprising:

tagging said cache line as DMA Exclusive once said other cache lines are in at least said weak ownership state; and responsive to said cache line being DMA Exclusive, grouping sequentially ordered second operations associated with said cache line and said other cache lines, wherein said second operations within a group may complete out-of-order with respect to each other.

4. The method of claim 3, wherein said releasing step includes pipelining an issuance of said second operations of said groups to said memory for completion in any order, responsive to acquiring a DMA Exclusive ownership for each of said second operations within said group.

5. The method of claim 4, further comprising messaging said I/O processor of a completion of each of said second operations in an order reflective of said sequential order.

6. The method of claim 5, wherein said generating step is completed from a second sequential DMA write request, and further comprising immediately forwarding a cache line requested by a first DMA Write request among said sequentially ordered DMA Write requests to memory for completion.

7. The method of claim 6, further comprising, responsive to a snoop of a requested cache line by another operation, releasing said cache line to said other operation when said cache line is in a weak ownership state; and forcing a retry of said other operation until after completion of a write to memory of said cache line when said cache line is in a DMA Exclusive state.

8. The method of claim 7, wherein said first operations are DMA_Write_No_Data operations, which operates with an address of said cache line, and said second operations are DMA_Write_With_Data, which transfers data of said cache line to memory.

9. The method of claim 8, further comprising, responsive to a request for a memory block written to by a DMA_Write_With_Data operation, forcing a retry of said request when a next DMA_Write_With_Data operation sequentially ahead of said DMA_Write_With_Data operation has not completed.

10. The method of claim 9, further comprising setting a coherency state of said cache line to indicate when said cache line is in a weak ownership state and when said cache line is held in said DMA Exclusive state.

11. A system for pipelining DMA Write operations in a data processing system having a memory and an Input/Output (I/O) processor, said system comprising:

means for performing a first operation to place a cache line being requested by a DMA write instruction in a weak ownership state;

means for delaying issuing of a second operation that writes said cache line to said memory until all other cache lines requested by previously issued first operations are also in said weak ownership state; and means for forwarding said cache line along with said other cache lines to said memory in any order, responsive to said cache line and said other cache lines all being in said weak ownership state.

12. The system of claim 11, wherein said performing is completed responsive to a receipt by said I/O processor of a DMA Write request among a plurality of sequentially ordered DMA Write requests, and further comprising means for generating said first operation for acquiring ownership of said requested cache line and said second operation for writing said requested cache line to memory.

13. The system of claim 12, further comprising:

means for tagging said cache line as DMA Exclusive once said other cache lines are in at least said weak ownership state; and means, responsive to said cache line being DMA Exclusive, for grouping sequentially ordered second operations associated with said cache line and said other cache lines, wherein said second operations within a group may complete out-of-order with respect to each other.

14. The system of claim 13, wherein said releasing means pipelines an issuance of said second operations of said groups to said memory for completion in any order, responsive to acquiring a DMA Exclusive ownership for each of said second operations within said group.

15. The system of claim 14, further comprising messaging said I/O processor of a completion of each of said second operations in an order reflective of said sequential order.

16. The system of claim 15, wherein said generating means performs a generation of said operations from a second sequential DMA Write request, and further comprising forwarding a cache line requested by a first DMA Write request among said sequentially ordered DMA Write requests to memory for completion.

17. The system of claim 16, further comprising means, responsive to a snoop of a requested cache line by another operation, for:

releasing said cache line to said other operation when said cache line is in a weak ownership state; and forcing a retry of said other operation until after completion of a write to memory of said cache line when said cache line is in a DMA Exclusive state.

18. The system of claim 17, wherein said first operations are DMA_Write_No_Data operations, which operates with an address of said cache line, and said second operations are DMA_Write_With_Data, which transfers data of said cache line.

19. The system of claim 18, further comprising means, responsive to a request for a memory block written to by a DMA_Write_With_Data operation, forcing a retry of said request when a next DMA_Write_With_Data operation sequentially ahead of said DMA_Write_With_Data operation has not completed.

20. The system of claim 19, further comprising means for setting a coherency state of said cache line to indicate when said cache line is held in a weak ownership state and when said cache line is held in said DMA Exclusive state.

21. A data processing system comprising a processor and a memory interconnected to said processor, and further comprising:

at least one Input/Output (I/O) device;

an I/O Channel Controller (IOCC) connected to said system bus and to said at least one I/O device; and a Direct Memory Access (DMA) DMA_Write response logic associated with said IOCC that:

responsive to a receipt of a plurality of sequentially ordered DMA_Write requests, generates corresponding DMA_Write_No_Data operations that are issued to said system bus to acquire ownership of requested cache lines; and responsive to acquiring DMA exclusive ownership of a plurality of cache lines requested by a set of said sequentially ordered DMA_Write requests, generates corresponding DMA_Write_With_Data operations that are issued in a pipelined manner and write said plurality of cache lines to said memory, wherein said DMA_Write_With_Data operations are completed out-of-order with respect to said sequential order.

22. The data processing system of claim 21, wherein further said DMA Write response logic provides a weak DMA ownership of a cache line when a cache line is available but a DMA Write request sequentially ahead of a present DMA Write request for said cache line has not yet acquired DMA Exclusive ownership, and wherein said weak ownership is released whenever a snoop of an operation for said cache line occurs prior to said present DMA Write request acquiring DMA Exclusive ownership of said cache line.

23. The data processing system of claim 22, wherein, when said DMA Write request sequentially ahead of said present DMA Write request acquires DMA Exclusive ownership of its requested cache line, said DMA Write response protocol automatically changes said weak DMA ownership of said present DMA Write request to a DMA Exclusive ownership, wherein any operation snooped for said cache line is forced to retry until said cache line has been written to memory.

24. The data processing system of claim 23, wherein each DMA_Write_With_Data operation of said subset is issued to said memory in along different paths and completes its write operation independent of a next write operation of a next DMA_Write_With_Data operation, wherein said write operation and said next write operation are completed out-of-order with respect to said sequential order of said DMA Write requests.

25. The data processing system of claim 24, further comprising means, responsive to a request for a memory block written to by a DMA_Write_With_Data, for forcing a retry of said request when a next DMA_Write_With_Data sequentially ahead of said DMA_Write_With_Data has not completed.

26. The data processing system of claim 25, wherein a completion of each of said write operation is message to said I/O processor in a same sequential order as said sequential order of said DMA Write requests.

27. The data processing system of claim 26, wherein, responsive to a determination that said DMA Write request is a first DMA Write request within a FIFO of said IOCC, said DMA response logic immediately initiates a DMA Write operation of said cache line to said memory.

* * * * *

UNITED STATES PATENT AND TRADEMARK OFFICE
CERTIFICATE OF CORRECTION

PATENT NO. : 6,782,456 B2
DATED : August 24, 2004
INVENTOR(S) : Arimilli et al.

It is certified that error appears in the above-identified patent and that said Letters Patent is hereby corrected as shown below:

Column 12,
Lines 41-45, should read:
-- 8.  The method of claim 7, wherein said first operations are DMA_Write_No_Data operations, which operates with an address of said cache line, and said second operations are DMA_Write_With_Data *operations*, which transfers data of said cache line to memory. --.

Column 13,
Lines 44-48, should read:
-- .18.  The system of claim 17, wherein said first operations are DMA_Write_No_Data operations, which operates with an address of said cache line, and said operations are DMA_Write_With_Data *operations*, which transfers data of said cache line. --.

Signed and Sealed this

Twenty-seventh Day of December, 2005

JON W. DUDAS
*Director of the United States Patent and Trademark Office*